(12) United States Patent
Beale et al.

(10) Patent No.: US 11,588,574 B2
(45) Date of Patent: *Feb. 21, 2023

(54) METHODS, INFRASTRUCTURE EQUIPMENT AND COMMUNICATIONS DEVICE

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,641

(22) Filed: Jun. 28, 2021

(65) Prior Publication Data

US 2021/0359785 A1 Nov. 18, 2021

Related U.S. Application Data

(63) Continuation of application No. 16/764,393, filed as application No. PCT/EP2018/081464 on Nov. 15, 2018, now Pat. No. 11,082,152.

(30) Foreign Application Priority Data

Nov. 16, 2017 (EP) .................................... 17202196

(51) Int. Cl.
    *H04L 1/00* (2006.01)
    *H04L 1/20* (2006.01)
    *H04L 25/02* (2006.01)

(52) U.S. Cl.
    CPC .......... *H04L 1/0016* (2013.01); *H04L 1/0026* (2013.01); *H04L 1/203* (2013.01); *H04L 1/206* (2013.01); *H04L 25/0204* (2013.01)

(58) Field of Classification Search
    None
    See application file for complete search history.

(56) References Cited

U.S. PATENT DOCUMENTS

| | | | |
|---|---|---|---|
| 2007/0165749 A1* | 7/2007 | Heiman ............... | H04B 7/0857 375/340 |
| 2013/0028200 A1* | 1/2013 | Nory ..................... | H04W 72/02 370/329 |

(Continued)

FOREIGN PATENT DOCUMENTS

| | | |
|---|---|---|
| EP | 2983306 A1 | 2/2016 |
| WO | 2016/122380 A1 | 8/2016 |
| WO | 2016/175576 A1 | 11/2016 |

OTHER PUBLICATIONS

International Search Report and Written Opinion dated Dec. 13, 2018 for PCT/EP2018/081464 filed on Nov. 15, 2018, 13 pages.

(Continued)

*Primary Examiner* — Mujtaba M Chaudry
(74) *Attorney, Agent, or Firm* — Xsensus LLP

(57) ABSTRACT

A method is performed by a wireless communications device of transmitting measurement reports to an infrastructure equipment. The method comprises receiving signals transmitted by the infrastructure equipment, measuring a characteristic associated with the received signals, and selecting an index value from one of a plurality of index values. Each of the index values represents a range of values of the characteristic for which communications parameters of a transmitter in the infrastructure equipment and a receiver in the communication device should have to achieve an acceptable communications performance for values of the characteristic within the range of values of the characteristic. The method further comprises, subject to the selected index value, transmitting the selected index value to the infrastructure equipment.

20 Claims, 5 Drawing Sheets

(56) References Cited

U.S. PATENT DOCUMENTS

| | | | | |
|---|---|---|---|---|
| 2014/0092785 | A1* | 4/2014 | Song | H04L 1/1621 |
| | | | | 370/280 |
| 2014/0369340 | A1* | 12/2014 | Horvat | H04B 17/336 |
| | | | | 370/350 |
| 2018/0175974 | A1* | 6/2018 | Wu | H04L 43/0864 |
| 2019/0132065 | A1* | 5/2019 | Yamashima | H04B 1/16 |

OTHER PUBLICATIONS

Fujitsu, "Design of efficient CQI repods for high reliability transmission," 3GPP TSG RAN WG1 Meeting NR Ad-Hoc Meeting, R1-1700657, Spokane, USA, Jan. 16-20, 2017, 5 pages.

NTT Docomo, Inc., "Views on DM-RS for mini-slot," 3GPP TSG RAN WG1 Meeting #90bis, R1-1718202, Prague, Czech Republic, Oct. 9-13, 2017, 11 pages.

Sony, "CQI reporting for efeMTC supporting 64QAM," 3GPP TSG RAN1#90bis, R1-1718265, Prague, Czech Republic, Oct. 9-13, 2017, 6 pages.

Ericsson, "Revised WID for Further Enhanced MTC for LTE," 3GPP TSG RAN Meeting #73, RP-161464, revision of RP-161321, New Orleans, USA, Sep. 19-22, 2016, 6 pages.

Huawei and HiSilicon, "Revised work item proposal: Enhancements of NB-IoT," 3GPP TSG RAN Meeting #73, RP-161901, revision of RP-161324, New Orleans, USA, Sep. 19-22, 2016, 7 pages.

Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.

Huawei et al., "New WID on Further NB-IoT enhancements" #3GPP TSG RAN Meeting #75, RP-170852, Dubrovnik, Croatia, Mar. 6-9, 2017, 6 pages.

3GPP, "LTE; Evolved Universal Terrestrial Radio Access (E-UTRA); Physical layer procedures," ETSI Technical Specification 36.213, Version 14.4.0, Release 14, Oct. 2017, pp. 1-463.

Holma, H. and Toskala, A, "LTE for UMTS OFDMA and SC-FDMA based radio access", John Wiley and Sons, 2009, 8 pp. 25-27.

* cited by examiner

METHODS, INFRASTRUCTURE EQUIPMENT AND COMMUNICATIONS DEVICE

CROSS-REFERENCE TO RELATED APPLICATIONS

The present application is a continuation of U.S. application Ser. No. 16/764,393, filed May 15, 2020, which is based on PCT filing PCT/EP2018/081464, filed Nov. 15, 2018, which claims priority to EP 17202196.6, filed Nov. 16, 2017, the entire contents of each are incorporated herein by reference.

BACKGROUND

Field of Disclosure

The present disclosure relates to infrastructure equipment and a communications device of wireless communications systems, where a communications device is configured to transmit a parameter indicative of a measured characteristic of a downlink transmission.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2]. [3]. [4]. At least some devices making use of these technologies are expected to be low complexity and inexpensive devices requiring relatively infrequent communication of relatively low bandwidth data.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a method of controlling communication of data from an infrastructure equipment to a wireless communications device. The method comprises receiving signals transmitted by the infrastructure equipment, measuring a characteristic associated with the received signals, and selecting an index value from one of a plurality of index values. Each of the index values represents a range of values of the characteristic for which communications parameters of a transmitter in the infrastructure equipment and a receiver in the communication device should have to achieve an acceptable communications performance for values of the characteristic within the range of values of the characteristic, and the selected index value represents the communications parameters of the transmitter and the receiver which will satisfy the acceptable communications performance over a range of values of the characteristic including the measured value of the characteristic. Subject to the selected index value, the method further comprises transmitting the selected index value to the infrastructure equipment. According to the method, a separation between the range of values of the characteristic for communications parameters achieving an acceptable performance corresponding to at least two of the plurality of indexes is not equal to a separation between the range of values of the characteristic for communications parameters achieving an acceptable performance corresponding to two others of the plurality of indexes.

Embodiments of the present technique have been devised to provide a plurality of index values indicating a selection of communications parameters of a transmitter in the infrastructure equipment and a receiver in the communication device which can achieve an acceptable communications performance for a range of values of a characteristic measured in respect of a transmission by the infrastructure equipment, in which a separation of the ranges of values of the characteristic varies between low values of the characteristic and high values of the characteristic.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
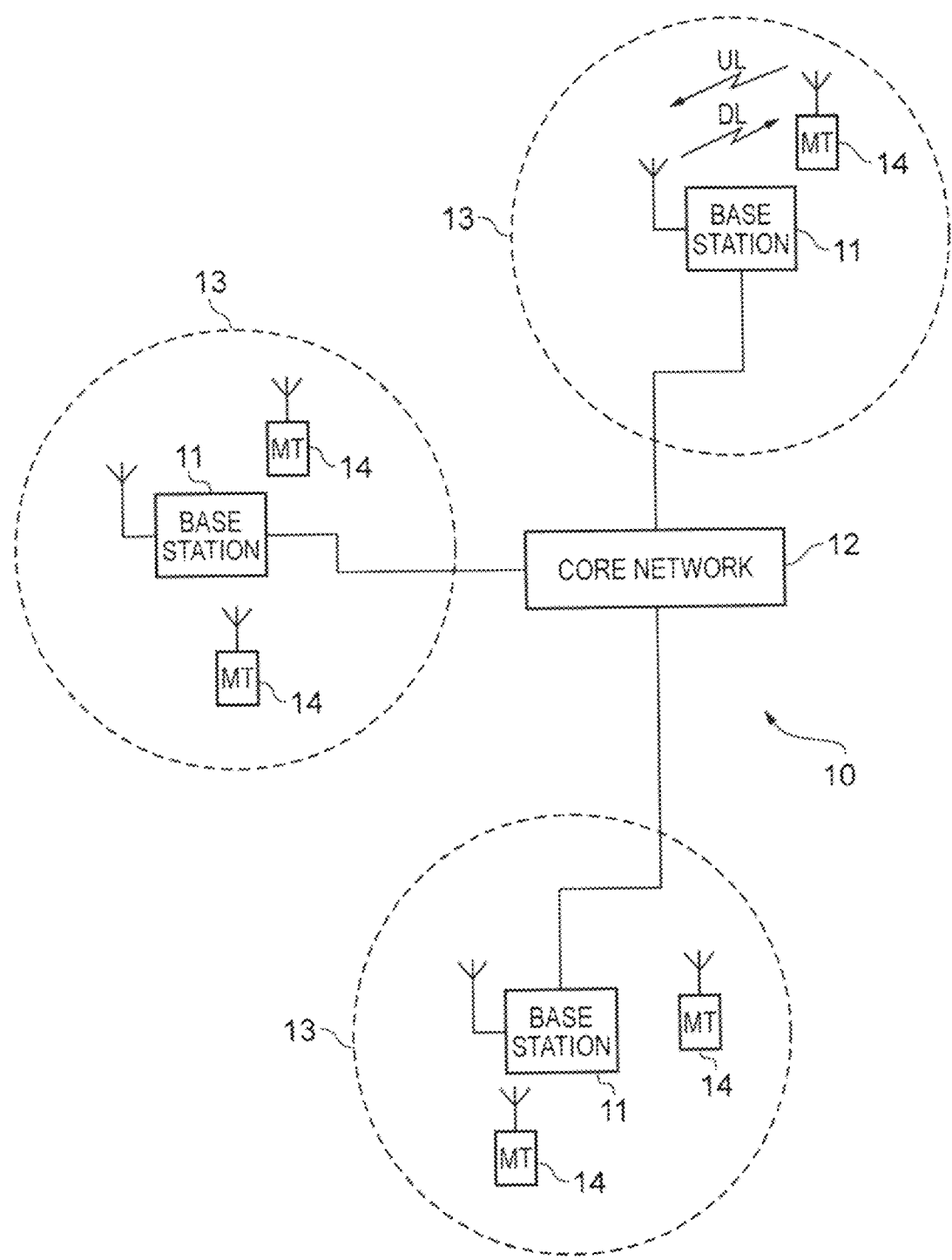
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink. Data is transmitted from terminal devices 14 to the base stations 11 via a radio uplink. The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
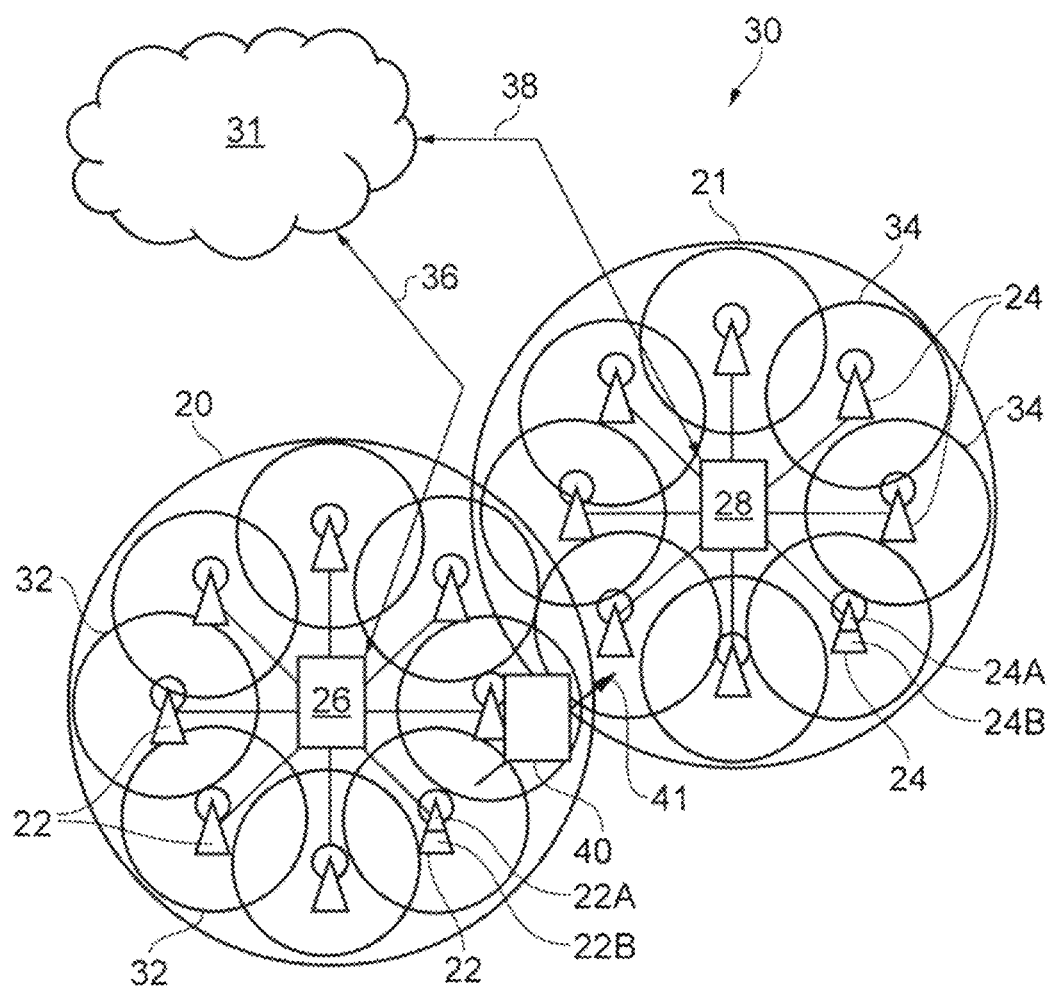
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22a, 22b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to the base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating. In such cases, as far as the terminal device is concerned, it simply transmits uplink data to the controlling node 26 and receives downlink data from the controlling node 26 and the terminal device has no awareness of the involvement of the distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense that it is not able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

In FIG. 1 and FIG. 2 the coverage areas or cells are shown as having a specified radius, that is they are shown as providing a specified coverage region. However in practice the coverage region within which a particular communications device can obtain service from the wireless communications network may depend on a number of different aspects. For example, the number and configuration of antennas in the communications device may impact the range at which it can receive service from the wireless communications network.

One of the goals of the machine type communication features is to provide coverage which is as extensive as possible to devices which have relatively low complexity, for example, that have only a single antenna. In order to obtain such enhanced coverage, one technique that is proposed to be used in the various eMTC specifications is to use repetition, whereby a given transport block may be repeated in consecutive valid subframes. The communications device may therefore receive multiple copies of the transport block and combine them to improve its likelihood of correct reception of the data. In eMTC it is proposed that there be 5 different modes of operation, referred to as eMTC CE Mode A and eMTC CE Mode B. The mode of operation will be configured for each communications device by means of radio resource control (RRC) configuration or reconfiguration messages and each mode will be associated with a 10 maximum and minimum number of repetitions which can be used.

As with conventional networks, the mobile communications network selects an appropriate modulation scheme and coding rate in order to optimise the system level capacity as 15 well as meeting the requirements for an individual communications device. For an eMTC device the number of repetitions will also be a parameter which can be adapted by the mobile communications network.

Compared with a non-eMTC user equipment it is 20 expected that an eMTC UE operating according to conventional i.e. non-eMTC techniques may experience a coverage or equivalently, performance, loss of around 5 to 6 dB as a result of the reduced complexity of the eMTC UE. The use of repetition in eMTC modes will enable a significant 25 increase in the coverage or performance that is achievable by an eMTC UE.

In CE Mode A, repetitions may occur up to 32 times and this is expected to result in a coverage performance roughly comparable to the performance of a non-eMTC UE. In 30 eMTC CE Mode B, up to 2048 repetitions may be used in order to provide yet further coverage enhancements for eMTC devices. The 32 times repetitions supported in CE Mode A also allows for overlap in the coverage region supported in CE Mode A and CE Mode B. The transition of 35 a device between eMTC CE Mode A and eMTC CE Mode B is, as mentioned above, by means of RRC reconfiguration. However, due to the increased system resources required as a result of a high number of repetitions used in CE Mode B it is expected that the mobile communications network will 40 configure a UE to use CE Mode B only when the received signal strength is very low. This may be either because the UE is located a long distance from the transmitter of the mobile communications network or because the transmissions from the network to the UE experience high path loss, 45 for example because of intervening walls or buildings or such like.

CQI Measurements

As described above, in order to meet the competing demands of a particular communications device which experiences 50 a particular path loss and channel effects in respect of the transmissions of the eNodeB which it receives and the desire to ensure maximum system capacity when considering the wireless communications network as a whole, the eNodeB operates an algorithm by which it determines a 55 suitable transport format for each transmission to each UE. This transport format may comprise one or more of a transport block size, a modulation format, a number of resource blocks and a number of repetitions. As an input to this algorithm, a UE may send channel state information 60 (CSI) to the eNodeB. The CSI may include a channel quality indication (CQI), which indicates a code rate and modulation format at which the UE expects to be able to receive hypothetical physical resources (which are known as reference resources) at a block error rate of no greater than 10%. 65 The UE may send the CQI to the eNodeB using a physical uplink control channel (PUCCH) channel which may be piggybacked on a physical uplink shared channel (PUSCH). The CQI may be encoded as an index to a CQI table. The CQI table for eMTC in release 14 is specified in 3GPP TS 36.213 v 14.4.0 and is reproduced as Table 1 below.

TABLE 1

(3GPP TS 36.213 v.14.4.0 Table 7.2.3-3: 4-bit CQI)

| CQI index | modulation | code rate × 1024 × $R^{CSI}$ | efficiency × $R^{CSI}$ |
|---|---|---|---|
| 0 | | Out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

For each CQI index in the table there is specified a modulation, a code rate and an efficiency. The CQI index transmitted by the UE to the eNodeB indicates the combination of modulation and code rate, and hence efficiency, at which it can receive reference resources at a block error rate of no greater than 10%. In the event that multiple combinations of modulation and code rate meet this criteria then the highest corresponding CQI index is transmitted.

Because of the high number of repetitions permitted in CE Mode B and because CE Mode B is expected to operate where the signal to noise ratio measured by the UE in respect of received signals may be very low or unreliable. CQI may not be reported in CE Mode B.

In order to accommodate the possible use of repetitions in eMTC it is proposed, for example in [6], that the eNodeB configures the UE with a parameter (RCSI) via RRC signalling. In Table 2 (taken from [6]), CQI indices 1 to 10 inclusive are evaluated by assuming that transmissions using the reference resources are repeated RCSI times.

TABLE 2

(from [6])

| CQI index | modulation | code rate × 1024 | Assumed $R^{CSI}$ | efficiency × $R^{CSI}$ |
|---|---|---|---|---|
| 0 | | out of range | | |
| 1 | QPSK | 40 | $R^{CSI}$ | 0.0781 |
| 2 | QPSK | 78 | $R^{CSI}$ | 0.1523 |
| 3 | QPSK | 120 | $R^{CSI}$ | 0.2344 |
| 4 | QPSK | 193 | $R^{CSI}$ | 0.3770 |
| 5 | QPSK | 308 | $R^{CSI}$ | 0 6016 |
| 6 | QPSK | 449 | $R^{CSI}$ | 0.8770 |
| 7 | QPSK | 602 | $R^{CSI}$ | 1.1758 |
| 8 | 16QAM | 378 | $R^{CSI}$ | 1.4766 |
| 9 | 16QAM | 490 | $R^{CSI}$ | 1.9141 |
| 10 | 16QAM | 616 | $R^{CSI}$ | 2.4063 |
| 11 | 64QAM | 466 | 1 | 2.7305 |
| 12 | 64QAM | 567 | 1 | 3.3223 |
| 13 | 64QAM | 666 | 1 | 3.9023 |
| 14 | 64QAM | 772 | 1 | 4.5234 |
| 15 | 64QAM | 873 | 1 | 5.1152 |

For example, referring Table 2, if the UE is configured with RCSI=2 and it reports CQI index=3, the UE is indicating that it can receive PDSCH at a BLER of <10% if the PDSCH is transmitted twice and is coded with a QPSK format and a code rate of less than 0.120.

For CE Mode A which operates with repetition levels of up to 32, RCSI can be assigned a value of between 1 and 32.

The determination of the CQI index which is reported by the UE is, strictly speaking, implementation dependent: that is, it depends on the expected performance of the individual communications device. Nevertheless it will be appreciated that the CQI index broadly reflects a signal to noise ratio (or range of signal to noise ratios) at which downlink signals transmitted from the wireless communications network to the communications device or UE are received. The following description is based on the use of a measured signal to noise ratio to derive the CQI index value; however, the present disclosure is not so limited. For example, in some embodiments of the present technique, a CQI Index value may be obtained based on a measured signal to interference and noise ratio (SINR), or based on a combination of measurements (which may be of the same type or of different types). A predetermined mapping which may be used by the communications device may thus refer to SNR ranges, SINR ranges, or any combination of these or other suitable measurements.

Figure 3:
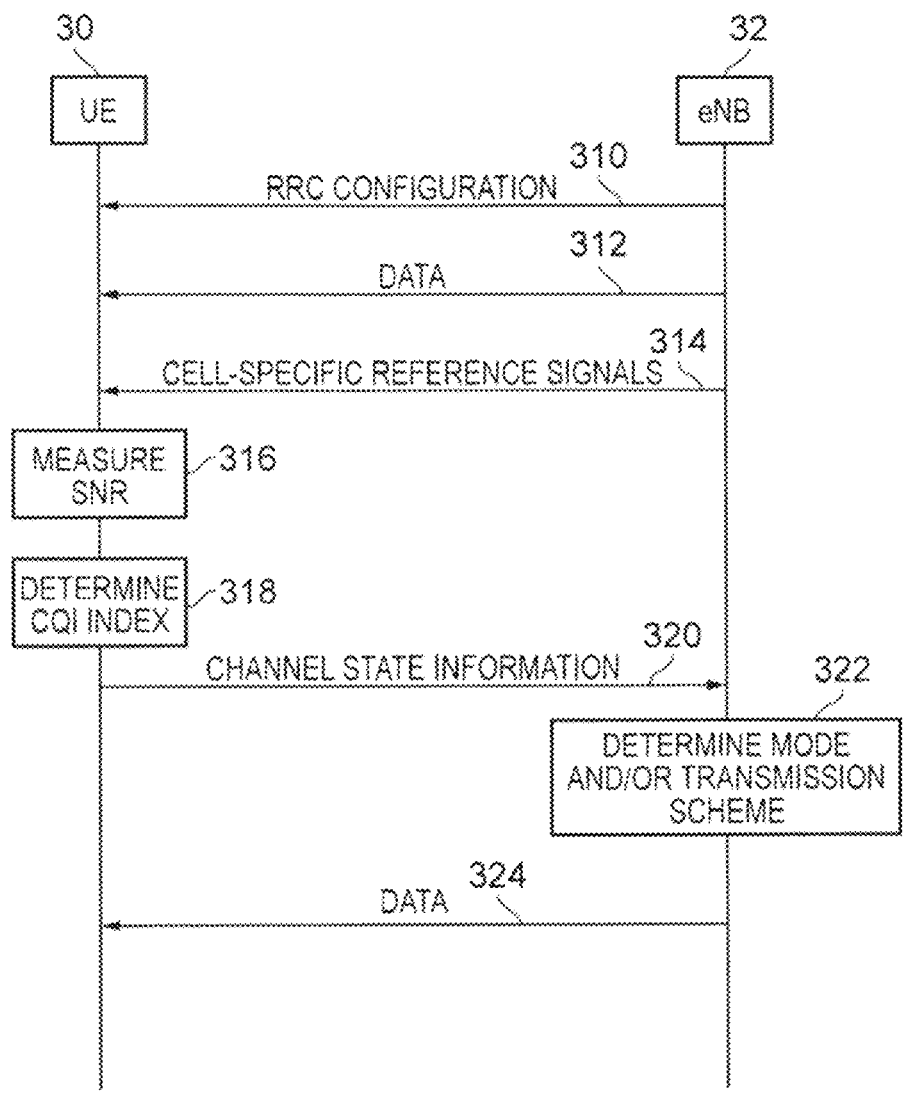
FIG. 3 illustrates a message sequence chart showing communications between a communications device and a mobile network in accordance with embodiments of the present technique.

An example of the use of the CQI index in accordance with the present technique is illustrated in FIG. 3. FIG. 3 illustrates the communications between a UE 30 and an eNodeB 32. The UE 30 may be, for example, one of the mobile terminals 14 illustrated in FIG. 1 or the communications device 40 illustrated in FIG. 2. Similarly the eNodeB 32 in FIG. 3 may correspond to, for example, the base station 11 in FIG. 1 or to the controlling node 26 shown in FIG. 2.

At step 310 the eNodeB 32 may configure the UE 30 with a radio resource configuration which specifies the mode of operation (for example the CE Mode A or the CE Mode B) in which the UE is to operate. It may also specify the RCSI that the UE is to use when determining the CQI index to report. In the example shown in FIG. 3 it is assumed that the CQI index is to be reported; this may be the case if, for example, the UE is operating in eMTC CE Mode A.

At step 312 the eNodeB 32 may transmit data to the UE 30 in accordance with the RRC configuration transmitted at step 310. This may comprise a number of repetitions of each transport block in accordance with the mode of operation with which the data is to be sent. For example, each transport block may be repeated up to 32 times in CE Mode A. In addition to the data transmissions 312 the eNodeB transmits cell specific reference signals 314.

In order to assist the eNodeB 32 in selecting an appropriate transport format for subsequent data transmissions the UE 30 transmits at step 320 channel state information including a determined CQI Index. As previously described, some aspects of the determination of the CQI Index may be implementation dependent, that is to say they are not specified in a standards document. However, the requirements for determining the CQI Index are specified insofar as they must be sufficient to enable the eNodeB to select a transport format at which the mobile device is expected to receive data with a block error rate (or probability of block error) of no higher that 10%. The CQI Index may therefore obtained by measuring aspects of the downlink signals, for example the cell specific reference signals 314 which are transmitted by the eNodeB 32. In particular, at step 316 the UE 30 may measure the signal to noise ratio, SNR, associated with the cell specific reference signals 314. Based on the measured SNR then at step 318 the UE 30 selects a CQI Index.

As will be appreciated, it may not be necessary to store a CQI Index table of the form shown in Tables 1 and 2 within the device; it may be sufficient to store a mapping between SNR values (or ranges thereof) and CQI Indices. In any case, it is expected that the UE 30 is required to assess one or more characteristics of downlink transmissions received from the eNodeB 32 in order to derive the appropriate CQI index value in order to comply with the specifications. The CQI index value may be selected from a plurality of CQI index values, each representing (or associated with) a range of signal to noise ratios. The plurality of CQI index values may further (alternatively or additionally) represent parameters to be used by a transmitter in the infrastructure equipment (such as the eNodeB 32). The range of signal to noise ratios associated with a CQI index may correspond to a range of signal to noise ratios at which a transmission, sent according to the parameters associated with the CQI index by the infrastructure equipment, is expected to be received by the communications device (such as the UE 30) with an acceptable communications performance (the requirements for which may be expressed in terms of a block error rate, a bit error rate or similar).

The range of signal to noise ratios may be non-overlapping; for example, where a CQI index value is associated with transmission parameters, the associated range of signal to noise ratios may extend only to a value at which transmissions sent according to parameters associated with any other CQI index value, which are less robust (but more efficient), are not expected to be received with sufficient communications performance. As such, the selected CQI index may correspond to the transmission parameters associated with the highest efficiency (or least robustness) of those transmission parameters associated with any CQI Index which, when applied to a transmission by the infrastructure equipment, results in those transmissions satisfying (or being expected to satisfy) the acceptable communications performance requirements.

The UE 30 transmits the selected CQI Index to the eNodeB 32 at step 320.

Following the reception of the channel state information at step 320, the eNodeB 32 determines the mode and/or transmission scheme for subsequent data transmissions at step 322. This determination may be based on knowledge of the mapping (in the form shown in Tables 1 and 2) with which the UE 30 is expected to comply, based on a proprietary algorithm, or based on a combination of both. The determination may be based on other factors, such as the traffic load in the cell and/or requirements for data transmissions to or by other UEs.

At the infrastructure equipment (such as the eNodeB 32), each CQI Index values may be associated with transmission parameters. The eNodeB 32 may not be aware of, or store any association between signal to noise ratios and CQI Index values. Nevertheless, the eNodeB 32 and the UE 30 may each independently maintain a mapping for each of a plurality of CQI Index values to at least one of a range of signal to noise ratios and transmissions parameters. The mapping may be in compliance with a published specification.

Following this determination, the eNodeB 32 subsequently transmits data 324, in accordance with the determined mode and/or transmission scheme.

Not shown in FIG. 3 is the possibility that the eNodeB 32 determines that the mode of operation should be changed, for example from CE Mode A to CE Mode B. In this case, as described above, then RRC reconfiguration is necessary in order to change the mode of operation of the UE 30 in respect of the downlink data transmissions such as the data transmissions 324.

In some embodiments, some of the steps shown in FIG. 3 may be omitted, or occur in a different order.

As described above, the CQI Index may be an index to a table of modulation schemes and code rates and so forth, however in practice in a given implementation of a specific user equipment, this may be implemented in the form of a predetermined mapping between a plurality of CQI Index values and associated signal to noise ratios or ranges thereof.

Figure 4:
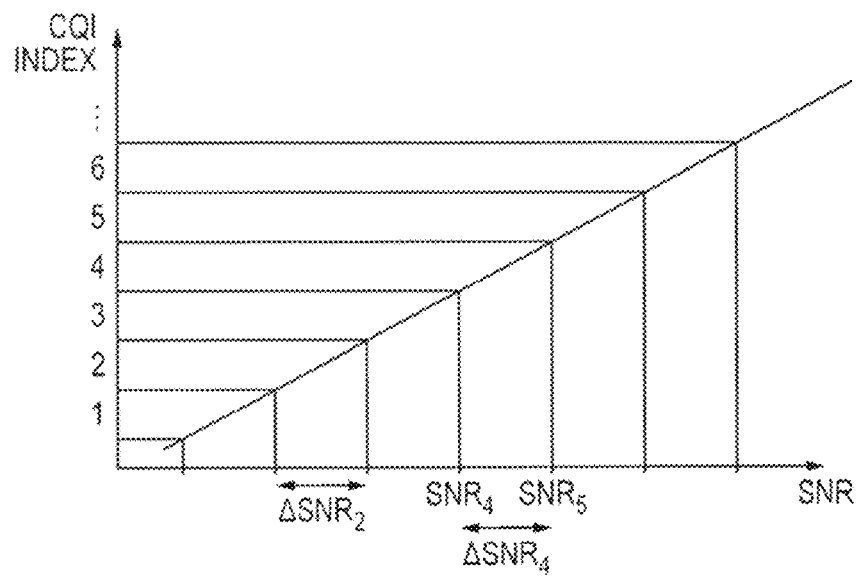
FIG. 4 illustrates graphically a relationship between measured signal to noise ratios and reported channel quality index (CQI) values according to a conventional technique.

A graphical representation of such a mapping is shown in FIG. 4.

Figure 5:
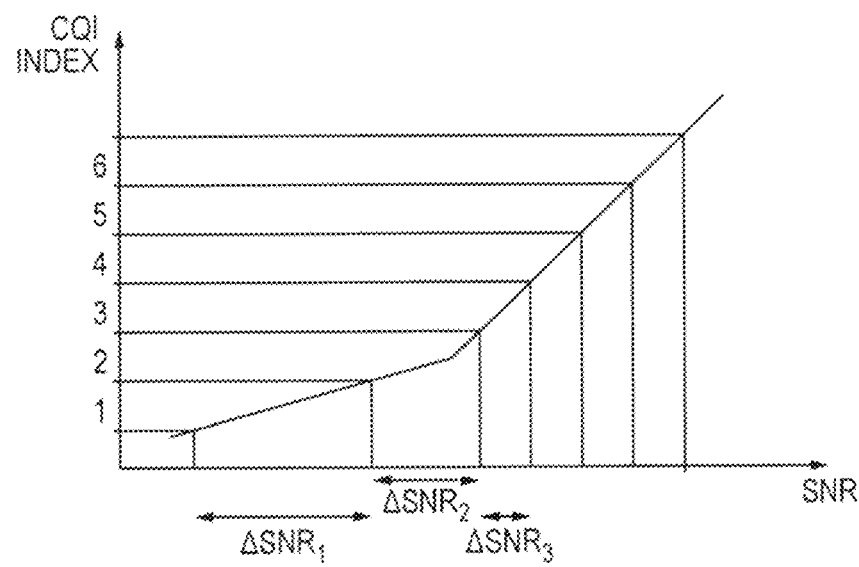
FIG. 5 illustrates graphically a relationship between measured signal to noise ratios and reported channel quality index (CQI) values according to an example of the present technique.
Figure 6:
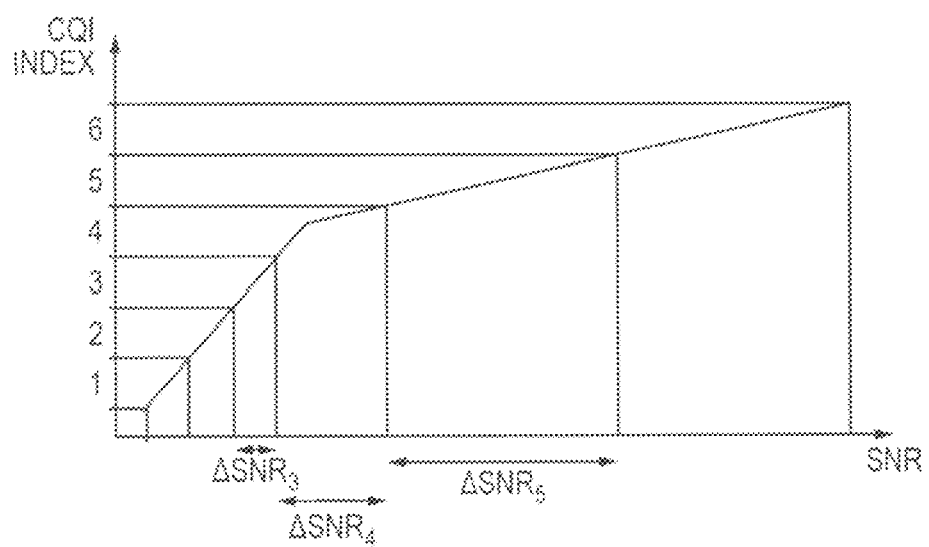
FIG. 6 illustrates graphically a relationship between measured signal to noise ratios and reported channel quality index (CQI) values according to an example of the present technique.

In the following descriptions, SNR values are assumed to be expressed in dB unless explicitly indicated otherwise. In FIGS. 4, 5 and 6, the signal to noise ratio is shown on the horizontal axis using a logarithmic (e.g. dB) scale, and the corresponding CQI index is shown on the vertical axis. $SNR_i$, indicates the lowest SNR at which the CQI Index value of i would be reported, and $\Delta SNR_i$, represents the range of SNR values at which CQI Index value of i would be reported. i.e. $\Delta SNR_i = SNR_{i+1} - SNR_i$, assuming that the SNR ranges are non-overlapping.

In this example, if the measured SNR exceeds the value indicated by $SNR_4$ but is lower than the value indicated at $SNR_5$ then the CQI index selected by the communications devices is 4. In the example mapping shown in FIG. 4 the gap between SNR values which correspond to the boundaries between adjacent CQI Index values is shown to be substantially similar for all CQI index values. Thus, for example, the gap $\Delta SNR_2$ is substantially the same as the gap $\Delta SNR_4$ between $SNR_4$ and $SNR_5$ and between all other consecutive SNR values which correspond to the boundaries between CQI index values.

Such a mapping between SNR value and CQI index may arise from the mapping proposed in [7], in which the distance between SNR values corresponding to the boundaries between successive CQI indices may be, for a significant portion of types of communications device, substantially the same across the range of SNR values. One feature of this mapping is that the number of repetitions is fixed in the table (i.e. there is no dependence on the value RCSI). This mapping is shown in Table 3 below.

TABLE 3

(from [7])

| CQI index | modulation | code rate × 1024 | Repetition |
|---|---|---|---|
| 0 | | Out of range | |
| 1 | QPSK | 51 | 32 |
| 2 | QPSK | 143 | 32 |
| 3 | QPSK | 167 | 16 |
| 4 | QPSK | 102 | 4 |
| 5 | QPSK | 256 | 4 |
| 6 | QPSK | 165 | 2 |
| 7 | QPSK | 171 | 1 |
| 8 | QPSK | 370 | 1 |
| 9 | QPSK | 594 | 1 |
| 10 | 16QAM | 427 | 1 |
| 11 | 16QAM | 580 | 1 |
| 12 | 16QAM | 774 | 1 |
| 13 | 64QAM | 607 | 1 |
| 14 | 64QAM | 768 | 1 |
| 15 | 64QAM | 870 | 1 |

While the exact values of the SNRs at which the boundaries between consecutive CQI index values occur depends on the implementation of the specific user equipment (taking into account, for example, the receiver design and antenna design and such forth), the relationship between SNR values such as the gap between $SNR_4$ and $SNR_5$ is broadly expected to be dependent upon the table specified in the standard which indicates the modulation and code rates and so on, corresponding to each CQI index. In other words it is possible, for example, to construct the table which maps CQI index values to modulation and code rates in such a manner that $\Delta SNR$ is substantially the same for all consecutive SNR boundaries regardless of the actual implementation of the user equipment or which is the case for a significant number of likely user equipment or communication device designs.

As a result of ongoing developments in the specification work associated with eMTC it has been determined that one or more CQI index values should correspond to modulation techniques based on 64QAM. Table 3 (taken from [7]) is an example of a proposed approach to address this. A further proposal for such a table addressing this issue, taken from [6], is shown above in Table 2.

In Table 2 it is indicated that the assumed RCSI is, for CQI index values corresponding to modulation schemes other than 64 QAM, set in accordance with the RCSI parameter configured by the eNodeB. However, the assumed RCSI is set to 1 if the modulation scheme is 64QAM; that is to say the reference transmissions which are assumed by the UE when determining which CQI index to report are assumed not to be repeated but are transmitted only once.

As described above, although the exact SNR values which correspond to the various CQI index values may vary from one implementation to another, it can be shown that, at least for a representative communication device design, the SNR values to which the various CQI indices correspond in Table 2 suffer from a large gap between the CQI index value 10 (being the highest CQI index value associated with a modulation scheme other than 64 QAM) and CQI index value 11 (being the lowest CQI index value associated with 64 QAM). This may be referred to as a CQI "dead zone".

By contrast, in the mapping shown above in Table 3, the gaps between the adjacent CQI indices, when expressed in terms of a corresponding signal to noise ratio in decibels, are substantially equal for all adjacent pairs of CQI indices. For example each CQI index value may cover a signal to noise ratio range ($\Delta SNR$) of approximately 2.5 dB. In the mapping in Table 3, it will be observed that the reference to RCSI is removed from the table of CQI indices and the table specifies a number of repetitions for each row.

At very low signal to noise ratios it may be that none of the modulation and coding schemes indicated as corresponding to CQI index values of 1 and higher would permit a communications device to receive data with a block error rate of less than 10%. As indicated in Table 1, Table 2 and Table 3, the CQI index value of 0 is conventionally used as an "out of range" indication, by which the UE indicates that none of the combinations of modulation and coding scheme which correspond to other CQI index values are considered sufficient to allow a block error rate of less than 10%.

CE Mode B Indication

Table 4 shown below illustrates an aspect of an embodiment of the present technique in which one or more CQI Index values are assigned to indicate that the UE considers that a different mode of operation from that currently used is more appropriate. For example, a CQI index value may be transmitted by the UE 30, presently operating in CE Mode A, to indicate that CE Mode B is a more appropriate mode of operation.

TABLE 4

| CQI index | modulation | code rate × 1024 | Assumed $R^{CSI}$ | efficiency × $R^{CSI}$ |
|---|---|---|---|---|
| 0 | | out of range | | |
| 1 | CE Mode B | | | |
| 2 | QPSK | 78 | 1 | 0.1523 |
| 3 | QPSK | 120 | 1 | 0.2344 |
| 4 | QPSK | 193 | 1 | 0.3770 |
| 5 | QPSK | 308 | 1 | 0.6016 |
| 6 | QPSK | 449 | 1 | 0.8770 |
| 7 | QPSK | 602 | 1 | 1.1758 |
| 8 | 16QAM | 378 | 1 | 1.4766 |
| 9 | 16QAM | 490 | 1 | 1.9141 |
| 10 | 16QAM | 616 | 1 | 2.4063 |
| 11 | 64QAM | 466 | 1 | 2.7305 |
| 12 | 64QAM | 567 | 1 | 3.3223 |
| 13 | 64QAM | 666 | 1 | 3.9023 |
| 14 | 64QAM | 772 | 1 | 4.5234 |
| 15 | 64QAM | 873 | 1 | 5.1152 |

According to an embodiment of the present technique, when the UE 30 in step 316 of FIG. 3 measures an SNR which is too low to permit effective operation in the present mode but which may permit effective operation in CE Mode B then it may select the CQI index indicating this at step 318, and transmit the corresponding CQI Index in the channel state information at step 320 of FIG. 3. In some embodiments, when an eNodeB such as eNodeB 32 of FIG. 3 receives channel state information indicating a CQI Index which corresponds to a recommendation or request from the UE to move to a different mode such as CE Mode B, then at step 322 of FIG. 3 the eNodeB 32 may determine that the subsequent data transmissions 324 to the UE 30 should be according to the CE Mode B and may accordingly reconfigure the UE to expect subsequent data transmissions to be in accordance with CE Mode B by means of an RRC Reconfiguration message (not shown).

In an alternative embodiment the eNodeB 32 may configure the UE for CE Mode B operation in response to a predetermined number of consecutive channel state information indications indicating (by means of the CQI Index) "CE Mode B" or a number of such indications within a predetermined larger number of consecutive channel state information indications. In some embodiments therefore the UE 30 may determine for example at step 318 of FIG. 3 that the SNR measured at step 316 falls below that required to obtain a 10% block error rate when operating in CE Mode A but may be sufficient to permit a 10% block error rate when operating in CE Mode B.

In some embodiments the UE 30 may determine at step 318 of FIG. 3 that the SNR measured at step 316 meets predetermined criteria for transmitting a CQI Index value corresponding to a requested or recommended change of mode. The criteria may be based upon one or more of an expected block error rate when operating in the present mode, an expected block error rate when operating in the requested or recommended mode, and a signal to noise ratio associated with received downlink transmissions and may comprise thresholds associated with one or more of the aforementioned rates or ratios.

Further embodiments of the present technique recognise that equal spacing between the SNR values corresponding to the boundaries of CQI indices may be disadvantageous. For example, this may result in inefficient link adaptation. In some embodiments of the present technique, the transmission parameters associated with CQI index values is such that the gap between SNR values (when considering at least a representative communications device design) corresponding to the boundaries between consecutive CQI indices is based on the value of the SNR values.

In a first example of these embodiments, the gap between SNR values corresponding to the boundaries between consecutive CQI indices is higher at low SNR values and decreases or remains constant as the corresponding CQI index increases.

This is illustrated in FIG. 5 in which it can be seen that $\Delta SNR_1$, which is the range of SNR values at which a CQI index value of 1 is reported, is higher than the range $\Delta SNR_2$, which is higher than $\Delta SNR_3$ and so on. At higher SNR values such as those indicated as corresponding to CQI indices 4, 5 and 6 the gap between the respective SNR values may be substantially equal or may further decrease as the signal to noise ratio increases.

This technique recognises that the accuracy of signal to noise ratio measurements at low signal to noise ratio values is typically poorer than the accuracy of assessments at higher signal to noise ratios. As such, this technique provides better granularity (in terms of SNR) at high values of SNR where accuracy is greater and correspondingly lower granularity where the accuracy of the SNR measurement is lower. This technique thereby apportions finite bandwidth available for CQI index reporting in an appropriate manner reflective of the accuracy of measuring signal to noise ratio by a receiver.

A further example of the present technique is illustrated in FIG. 6. In this example the granularity with which the signal to noise ratio is mapped to CQI index again varies depending on the value of the signal to noise ratio. This example reflects the observation that the system capacity of a mobile communications network is highly sensitive to the number of repetitions and the modulation and coding scheme which are used for devices experiencing low signal to noise ratios. This is because, in general, a given amount of data transmitted to a device which is experiencing a low signal to noise ratio requires significantly more resources in terms of time, frequency and so forth than the same amount of data being transmitted to a communications device which is benefitting from a higher signal to noise ratio. This technique therefore provides the eNodeB with greater accuracy of signal to noise ratio estimation at lower signal to noise ratio values. This in turn permits the eNodeB to perform more effective link adaptation in respect of transmissions over low SNR communications paths, and therefore may provide benefits in terms of system capacity.

In the specific example shown in FIG. 6 the gap between signal to noise ratios which correspond to the boundaries between consecutive CQI indices is low at low signal to noise ratios as shown by, for example, $\Delta SNR_3$. The range $\Delta SNR$ increases as the SNR value increases, as is shown by $\Delta SNR_4$ (which is greater than $\Delta SNR_3$) and $\Delta SNR_5$ (which is greater than $\Delta SNR_4$) as the signal to noise ratio improves.

In general, embodiments of the present technique provide for a mapping from a measured signal to noise ratio to a CQI index value. Two or more SNR ranges (when expressed in decibels or other logarithmic form), bounded by SNR values $SNR_i$ and $SNR_{i+1}$ and having a range $\Delta SNR_i$ for i=1, 2 [, . . . ] correspond to different CQI Index values. In some embodiments, $\Delta SNR_i \leq \Delta SNR_j$ for all i, j, if $SNR_j > SNR_i$. The mapping illustrated in FIG. 6 is an example of such an embodiment.

In some other embodiments, $\Delta SNR_i \geq \Delta SNR_j$ for all i, j, if $SNR_j > \Delta SNR_i$. The mapping illustrated in FIG. 5 is an example of such an embodiment.

In preferred embodiments, the SNR ranges are non-overlapping.

In the above, it should be emphasised that since the actual SNR values depend on the design and configuration of the UE, the inequalities $\geq$ and $\leq$ are to be interpreted as "substantially greater than or equal to" (respectively, "substantially less than or equal to"), such that insignificant deviations from a strict interpretation are within the scope of the presently disclosed techniques.

In some embodiments, $\Delta SNR_n$, where n is the corresponding CQI Index value to which the range of SNR values is mapped, and $\Delta SNR_n$ is the width of the range (expressed in dB or similar logarithmic scale) is a function of n or of a representative SNR within the range (which may be, for example, the minimum, maximum, or median value in the range). The function may be linear or piece-wise linear or any suitable monotonically non-decreasing (or in some embodiments, non-increasing) function.

In some embodiments of the present technique a communications device may be preconfigured with multiple tables (that is to say, multiple mappings from a signal to noise ratio or equivalently, from transmission formats) to a CQI index value. These multiple tables may correspond, for example, to the mappings indicated in FIGS. 5 and 6. In such embodiments the CQI Index may be selected according to one or other of the tables, the table being selected according to an RRC configuration of the UE by the eNodeB or broadcast system information transmissions from the network.

In some embodiments the network, for example the eNodeB 32 of FIG. 3, may select the table to be used by a given UE, for example the UE 30 of FIG. 3, based on subscription information or any other information known to the network in respect of the UE. For example, if a device is known to be mobile and hence to not operate for long periods of time in very poor coverage regions, such a UE could be configured to use a CQI table optimised for high signal to noise ratio operation such as illustrated in FIG. 5.

Alternatively the selection of the CQI mapping table may be made by the UE in which case the UE may report which CQI table it has used or will use in the future. The UE may report this either as part of the distinct CQI reporting procedure or by means of RRC signalling for example during an RRC connection establishment. It will be readily appreciated that embodiments relating to the spacing of SNR values corresponding to adjacent CQI indices may be combined with the technique of providing for a CQI index indicative of a preference or recommendation by the UE to transition to a different mode, for example to transition from CE Mode A to CE Mode B.

As will be readily apparent and as described above, the means by which mapping from measured characteristics of downlink signals to a reported CQI index value is performed by a UE is not limited to the examples described above.

In the examples described above, it has been assumed that link adaptation is under the control of a mobile communication network infrastructure equipment, such as an eNodeB. However, it will be appreciated that the above techniques can be applied to closed-loop link adaptation in other scenarios, such as in device to device communications or in a mesh network.

As described above, embodiments of the present technique provide improved techniques for link adaptation by a transmitter by means of channel quality reporting.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of transmitting measurement reports by a wireless communications device to an infrastructure equipment, the method comprising:
  receiving signals transmitted by the infrastructure equipment,
  measuring a characteristic associated with the received signals.
  selecting an index value from one of a plurality of index values, each of the index values representing a range of values of the characteristic for which communications parameters of a transmitter in the infrastructure equipment and a receiver in the communication device should have to achieve an acceptable communications performance for a value of the characteristic within the range of values of the characteristic, the selected index value representing the communications parameters of the transmitter and the receiver which will satisfy the acceptable communications performance over a range of values of the characteristic including the measured value of the characteristic, and
  subject to the selected index value, transmitting the selected index value to the infrastructure equipment, wherein a separation between the range of values of the characteristic for communications parameters achieving an acceptable performance corresponding to at least two of the plurality of indexes is not equal to a separation between the range of values of the characteristic for communications parameters achieving an acceptable performance corresponding to two others of the plurality of indexes.

Paragraph 2. A method according to Paragraph 1 wherein the characteristic is a signal to noise ratio.

Paragraph 3. A method according to Paragraph 1 wherein and the characteristic is a signal to interference and noise ratio.

Paragraph 4. A method according to any of Paragraphs 1 to 3, comprising
  receiving data from the infrastructure equipment according to a first mode for communications parameters providing an acceptable level of performance for one of the index values according to the first mode, and
  determining that the measured value of the characteristic is within a range of values of the characteristic which would achieve the acceptable level of performance according to a second mode corresponding to a preferred second index, different from the first mode, is preferred,
  wherein the value of the index transmitted to the infrastructure equipment is the second index corresponding to the range of values of the characteristic at which operation in the second mode is preferred.

Paragraph 5. A method according to Paragraph 4, wherein the index corresponding to the second mode indicates a set of communications parameters and a predetermined number of repetitions and in the second mode the transmitting the selected index value to the infrastructure equipment subject to the selected index value, comprises not transmitting the selected index value to the infrastructure equipment.

Paragraph 6. A method according to any of Paragraphs 1 to 5, wherein
the communication parameters corresponding to each of the plurality of index values comprise one or more of a modulation scheme, a code rate, a number of repetitions, and an efficiency, each index value corresponding to different values of the communications parameters for which an acceptable level of performance can be achieved corresponding to an acceptable error rate.

Paragraph 7. A method according to Paragraph 6, wherein the acceptable error rate is 10%.

Paragraph 8. A method according to any of Paragraphs 1 to 7, wherein the separation between the range of values of the characteristic for communications parameters achieving an acceptable performance corresponding to two of the plurality of indexes at a lower value of the characteristic is less than the separation between the range of values of the characteristic for communications parameters achieving an acceptable performance corresponding to two others of the plurality of indexes at higher values of the characteristic.

Paragraph 9. A method according to any of Paragraphs 1 to 7, wherein the separation between the range of values of the characteristic for communications parameters achieving an acceptable performance corresponding to two of the plurality of indexes at a higher value of the characteristic is less than the separation between the range of values of the characteristic for communications parameters achieving an acceptable performance corresponding to two others of the plurality of indexes at lower values of the characteristic.

Paragraph 10. A method of transmitting data by an infrastructure equipment to a wireless communications device, the method comprising:
establishing a connection between the infrastructure equipment and the wireless communications device,
transmitting data to the wireless communications device according to a first transmission scheme,
receiving from the wireless communications device a value of an index selected from a plurality of index values, each of the index values representing a range of values of a characteristic for which communications parameters of a transmitter in the infrastructure equipment and a receiver in the communication device should have to achieve an acceptable communications performance for a value of the characteristic within the range of values of the characteristic,
selecting a second transmission scheme for the transmission of the data to the wireless communications device, based on the received value of the index received from one of the plurality of index values, the second transmission scheme having communications parameters according to the received value of the index and the communications parameters of the transmitter and the receiver which will satisfy the acceptable communications performance over a range of values of the characteristic including the measured value of the characteristic, and
transmitting the data to the wireless communications device in accordance with the second transmission scheme, wherein a separation between the range of values of the characteristic for communications parameters achieving an acceptable performance corresponding to at least two of the plurality of indexes is not equal to a separation between the range of values of the characteristic for communications parameters achieving an acceptable performance corresponding to two others of the plurality of indexes.

Paragraph 11. A method according to Paragraph 10 wherein the characteristic is a signal to noise ratio.

Paragraph 12. A method according to Paragraph 10 wherein the characteristic is a signal to interference and noise ratio.

Paragraph 13. A method according to any of Paragraphs 10 to 12, comprising
transmitting data to the wireless communications device according to a first mode for communications parameters providing an acceptable level of performance for one of the index values according to the first mode,
wherein the value of the index received is an index value corresponding to a range of values of the characteristic at which operation in the second mode is preferred.

Paragraph 14. A communications device configured to transmit radio signals to and/or receive radio signals from an infrastructure equipment of a wireless communications network, the communications device comprising
a receiver circuit configured to receive radio signals transmitted by the infrastructure equipment via a wireless access interface.
a transmitter circuit configured to transmit radio signals to the infrastructure equipment via the wireless access interface, and
a controller circuit configured to control the transmitter circuit and the receiver circuit to transmit data to or receive data from the wireless communications network via the infrastructure equipment, wherein the controller circuit is configured to control the receiver circuit
to receive signals transmitted by the infrastructure equipment.
to measure a characteristic associated with the received signals,
to select an index value from one of a plurality of index values, each of the index values representing a range of values of the characteristic for which communications parameters of a transmitter in the infrastructure equipment and a receiver in the communication device should have to achieve an acceptable communications performance for values of the characteristic within the range of values of the characteristic, the selected index value representing the communications parameters of the transmitter and the receiver which will satisfy the acceptable communications performance over a range of values of the characteristic including the measured value of the characteristic, and
the controller circuit is configured to control the transmitter circuit, subject to the selected index value, to transmit the selected index value to the infrastructure equipment, wherein, a separation between the range of values of the characteristic for communications parameters achieving an acceptable performance corresponding to at least two of the plurality of indexes is not equal to a separation between the range of values of the characteristic for communications parameters achieving an acceptable performance corresponding to two others of the plurality of indexes.

Paragraph 15. A communications device according to Paragraph 14 wherein the characteristic is a signal to noise ratio.

Paragraph 16. A communications device according to Paragraph 14 wherein the characteristic is a signal to interference and noise ratio.

Paragraph 17. A communications device according to any of Paragraphs 14 to 16, wherein the controller circuit is configured to control the transmitter circuit
- to receive data from the infrastructure equipment according to a first mode for communications parameters providing an acceptable level of performance for one of the index values according to the first mode,
- to determine that the measured value of the characteristic is within a range of values of the characteristic which would achieve the acceptable level of performance according to a second mode corresponding to a preferred second index, different from the first mode, is preferred, and wherein
- the value of the index transmitted to the infrastructure equipment is the second index corresponding to the range of values of the characteristic at which operation in the second mode is preferred.

Paragraph 18. An infrastructure equipment forming a radio network part of a wireless communications network, configured to transmit data to and/or receive data from a wireless communications device, the infrastructure equipment comprising
- receiver circuitry configured to receive radio signals transmitted by the wireless communications device via a wireless access interface,
- transmitter circuitry configured to transmit radio signals to the wireless communications device via the wireless access interface, and
- controller circuitry configured to control the transmitter circuitry and the receiver circuitry to transmit data to or receive data from the wireless communications device, wherein the controller circuitry is configured
- to establish a connection between the infrastructure equipment and the wireless communications device,
- to transmit data to the wireless communications device according to a first transmission scheme,
- to receive from the wireless communications device a value of an index selected from a plurality of index values, each of the index values representing a range of values of a characteristic for which communications parameters of a transmitter in the infrastructure equipment and a receiver in the communication device should have to achieve an acceptable communications performance for a value of the characteristic within the range of values of the characteristic,
- to select a second transmission scheme for the transmission of the data to the wireless communications device, based on the received value of the index received from one of the plurality of index values, the second transmission scheme having communications parameters according to the received value of the index and the communications parameters of the transmitter and the receiver which will satisfy the acceptable communications performance over a range of values of the characteristic including the measured value of the characteristic, and
- to transmit the data to the wireless communications device in accordance with the second transmission scheme, and
- wherein a separation between the range of values of the characteristic for communications parameters achieving an acceptable performance corresponding to at least two of the plurality of indexes is not equal to a separation between the range of values of the characteristic for communications parameters achieving an acceptable performance corresponding to two others of the plurality of indexes.

Paragraph 19. An infrastructure equipment according to Paragraph 18 wherein the characteristic is a signal to noise ratio.

Paragraph 20. An infrastructure equipment according to Paragraph 18 wherein the characteristic is a signal to interference and noise ratio.

Paragraph 21. An infrastructure equipment according to any of Paragraphs 18 to 20, wherein the controller circuitry is configured to control the receiver circuitry
- to transmit data to the wireless communications device according to a first mode for communications parameters providing an acceptable level of performance for one of the index values according to the first mode,
- and the value of the index received is an index value corresponding to a range of values of the characteristic at which operation in the second mode is preferred Paragraph 22. A method of transmitting measurement reports by a wireless communications device to an infrastructure equipment, the method comprising:
- receiving signals transmitted by the infrastructure equipment,
- measuring a characteristic associated with the received signals.
- transmitting to the infrastructure equipment a value of a parameter indicative of a range of values of the characteristic, the range of values of the characteristic including the measured value of the characteristic,
- the value of the parameter being associated with the range of values of the characteristic according to a predetermined mapping comprising a plurality of parameter values each associated with one of a plurality of ranges of values of the characteristic, the extent of each range of values of the characteristic determined based on the magnitude of the characteristic values within the range.

Paragraph 23. A method according to Paragraph 22 wherein the characteristic is one of a signal to noise ratio and a signal to interference and noise ratio.

Paragraph 24. The method of any of Paragraphs 22 and 23, comprising
- receiving data from the infrastructure equipment according to a first mode, and
- determining that the measured value of the characteristic is within a predetermined range at which a second mode, different from the first mode, is preferred,
- wherein the mapping comprises a value of the parameter corresponding to a range of values of the characteristic at which operation in the second mode is preferred, and
- the value of the parameter transmitted to the infrastructure equipment is the value corresponding to the range of values of the characteristic at which operation in the second mode is preferred.

Paragraph 25. The method of Paragraph 24, wherein
- the pre-determined mapping associates a value of the parameter with a range of values of the characteristic at which data received on a reference resource which was transmitted according to a predetermined transmission scheme associated with the value would be received with a probability of error approximately less than a predetermined error rate threshold.
- the predetermined transmission scheme being characterized by one or more of a modulation scheme, a code rate, a number of repetitions, and an efficiency,
- the pre-determined transmission scheme being different for each associated value of the parameter.

Paragraph 26. The method of Paragraph 25, wherein the predetermined error rate threshold is 10%.

Paragraph 27. The method of any of Paragraphs 23 to 26, wherein the widths of the plurality of ranges of values of the characteristic comprise at least two different widths.

and, for each first range of values of the characteristic in the plurality of ranges of values of the characteristic, the width of each, if any, second range of values of the characteristic which include values of the characteristic which are higher than the first range of values of the characteristic is no larger than the width of the first range.

Paragraph 28. The method of any of Paragraphs 23 to 26, wherein the widths of the plurality of ranges of values of the characteristic comprise at least two different widths, and, for each first range of values of the characteristic in the plurality of ranges of values of the characteristic, the width of each, if any, second range of values of the characteristic which include values of the characteristic which are higher than the first range of values of the characteristic is no smaller than the width of the first range.

Paragraph 29. A method of transmitting data by an infrastructure equipment to a wireless communications device, the method comprising:

establishing a connection between the infrastructure equipment and the wireless communications device.

transmitting reference signals, receiving from the wireless communications device a value of a parameter indicative of a first transmission scheme, the transmission scheme comprising at least one of a modulation scheme, a code rate, a number of repetitions and an efficiency, selecting a second transmission scheme for the transmission of the data to the wireless communications device, based on the received value of the parameter, transmitting the data to the wireless communications device in accordance with the second transmission scheme, the value of the parameter being associated at the infrastructure equipment with the first transmission scheme according to a predetermined mapping, the mapping comprising a plurality of parameter values and associated transmission schemes, and the value of the parameter being associated at the wireless communications device with a range of values of a characteristic of a transmission measured by the wireless communications device according to a predetermined mapping comprising a plurality of parameter values each associated with one of a plurality of ranges of values of the characteristic, the extent of each range of values of the characteristic determined based on the magnitude of the values of the characteristic within the range.

Paragraph 30. A method according to Paragraph 29, wherein the first transmission scheme and the second transmission scheme are the same.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73. New Orleans. USA, Sep. 19-22, 2016.
[2] RP-161901. "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia. Mar. 6-9, 2017.
[5] Holma H. and Toskala A, "LTE for UMTS OFDMA and SC-FDMA based radio access". John Wiley and Sons, 2009.
[6] R1-1712802, "Increased PDSCH spectral efficiency". Qualcomm. RAN1 #90. Prague, Czech Republic. 21-25 Aug. 2017.
[7] R1-1718265, "CQI reporting for efeMTC supporting 64QAM". Sony. RAN1 #90bis. Prague, Czech Republic. 9-13 Oct. 2017.

What is claimed is:

1. A method of transmitting measurement reports by a wireless communications device to an infrastructure equipment, the method comprising:

receiving signals transmitted by the infrastructure equipment;

measuring a characteristic associated with the received signals;

selecting a channel quality index (CQI) value from a plurality of CQI values, each of the CQI values representing a range of values of the characteristic, wherein the CQI value indicates communications parameters of a transmitter in the infrastructure equipment and a receiver in the communication device which achieves an acceptable communications performance within the range of values of the characteristic; and subject to the CQI value, transmitting the CQI value to the infrastructure equipment, wherein a first separation between a value of the characteristic for a first CQI value and a value of the characteristic for a second CQI value for communications parameters achieving an acceptable performance is not equal to a second separation between a values of the characteristic for a third CQI value and a value of the characteristic for a fourth CQI value.

2. The method of claim 1, wherein the second separation is more than twice as large as the first separation.

3. The method of claim 1, wherein the characteristic is a signal to noise ratio.

4. The method of claim 1, wherein the characteristic is a signal to interference and noise ratio.

5. The method of claim 1, wherein the communication parameters corresponding to each of the plurality of CQI values comprise one or more of a modulation scheme, a code rate, a number of repetitions, and an efficiency, each CQI value corresponding to different values of the communications parameters for which an acceptable level of performance can be achieved corresponding to an acceptable error rate.

6. The method of claim 5, wherein the acceptable error rate is 10%.

7. The method of claim 1, wherein the separation between the range of values of the characteristic for communications parameters achieving an acceptable performance corresponding to two of the plurality of CQI values at a lower value of the characteristic is less than the separation between the range of values of the characteristic for communications parameters achieving an acceptable performance corresponding to two others of the plurality of CQI values at higher values of the characteristic.

8. The method of claim 1, wherein the separation between the range of values of the characteristic for communications parameters achieving an acceptable performance corresponding to two of the plurality of CQI values at a higher value of the characteristic is less than the separation between the range of values of the characteristic for communications parameters achieving an acceptable performance corresponding to two others of the plurality of CQI values at lower values of the characteristic.

9. A wireless communications device comprising:
circuitry configured to
receive signals transmitted by the infrastructure equipment;
measure a characteristic associated with the received signals;
select a channel quality index (CQI) value from a plurality of CQI values, each of the CQI values representing a range of values of the characteristic, wherein the CQI value indicates communications parameters of a transmitter in the infrastructure equipment and a receiver in the communication device which achieves an acceptable communications performance within the range of values of the characteristic; and
subject to the CQI value, transmit the CQI value to the infrastructure equipment, wherein a first separation between a value of the characteristic for a first CQI value and a value of the characteristic for a second CQI value for communications parameters achieving an acceptable performance is not equal to a second separation between a values of the characteristic for a third CQI value and a value of the characteristic for a fourth CQI value.

10. The wireless communications device of claim 9, wherein
the second separation is more than twice as large as the first separation.

11. The wireless communications device of claim 9, wherein
the characteristic is a signal to noise ratio.

12. The wireless communications device of claim 9, wherein
the characteristic is a signal to interference and noise ratio.

13. The wireless communications device of claim 9, wherein
the communication parameters corresponding to each of the plurality of CQI values comprise one or more of a modulation scheme, a code rate, a number of repetitions, and an efficiency, each CQI value corresponding to different values of the communications parameters for which an acceptable level of performance can be achieved corresponding to an acceptable error rate.

14. The wireless communications device of claim 13, wherein
the acceptable error rate is 10%.

15. The wireless communications device of claim 9, wherein
the separation between the range of values of the characteristic for communications parameters achieving an acceptable performance corresponding to two of the plurality of CQI values at a lower value of the characteristic is less than the separation between the range of values of the characteristic for communications parameters achieving an acceptable performance corresponding to two others of the plurality of CQI values at higher values of the characteristic.

16. The wireless communications device of claim 9, wherein
the separation between the range of values of the characteristic for communications parameters achieving an acceptable performance corresponding to two of the plurality of CQI values at a higher value of the characteristic is less than the separation between the range of values of the characteristic for communications parameters achieving an acceptable performance corresponding to two others of the plurality of CQI values at lower values of the characteristic.

17. Circuitry for a wireless communications device, the circuitry configured to:
receive signals transmitted by the infrastructure equipment;
measure a characteristic associated with the received signals;
select a channel quality index (CQI) value from a plurality of CQI values, each of the CQI values representing a range of values of the characteristic, wherein the CQI value indicates communications parameters of a transmitter in the infrastructure equipment and a receiver in the communication device which achieves an acceptable communications performance within the range of values of the characteristic; and
subject to the CQI value, transmit the CQI value to the infrastructure equipment, wherein a first separation between a value of the characteristic for a first CQI value and a value of the characteristic for a second CQI value for communications parameters achieving an acceptable performance is not equal to a second separation between a values of the characteristic for a third CQI value and a value of the characteristic for a fourth CQI value.

18. The circuitry of claim 17, wherein
the second separation is more than twice as large as the first separation.

19. The circuitry of claim 17, wherein
the characteristic is a signal to noise ratio.

20. The circuitry of claim 17, wherein
the characteristic is a signal to interference and noise ratio.

* * * * *